(12) United States Patent
Ogata (10) Patent No.: US 6,466,450 B1
(45) Date of Patent: Oct. 15, 2002

(54) GAME MACHINE APPARATUS

(75) Inventor: Hiroki Ogata, Chiba (JP)

(73) Assignee: Sony Computer Entertainment Inc. (JP)

( * ) Notice: Subject to any disclaimer, the term of this patent is extended or adjusted under 35 U.S.C. 154(b) by 0 days.

(21) Appl. No.: 09/537,323

(22) Filed: Mar. 29, 2000

Related U.S. Application Data (63) Continuation of application No. 09/234,018, filed on Jan. 19, 1999, which is a continuation of application No. 08/450,683, filed on May 25, 1995.

(30) Foreign Application Priority Data

May 27, 1994 (JP) ............................................. 6-115573

(51) Int. Cl.[7] ................................................ H05K 5/00
(52) U.S. Cl. ........................ 361/756; 361/752; 361/759; 463/43; 463/45
(58) Field of Search ................................ 361/756, 759, 361/814, 683, 752; 463/31–35, 43; 273/434–437; 439/44–48

(56) References Cited

U.S. PATENT DOCUMENTS

| 4,084,875 A | 4/1978 | Yamamoto |
| 4,586,128 A | 4/1986 | DeWoskin |
| 4,849,944 A | 7/1989 | Matsushita |

(List continued on next page.)

FOREIGN PATENT DOCUMENTS

| EP | 0 431 723 A3 | 6/1991 |
| EP | 0 431 723 AE | 6/1991 |
| JP | 48-109490 | 12/1973 |
| JP | 54-2834 | 1/1979 |
| JP | U-62-150878 | 9/1987 |
| JP | 64-48886 | 3/1989 |
| JP | 64-50487 | 3/1989 |
| JP | 2-3672 | 1/1990 |
| JP | U-03-039267 | 4/1991 |
| JP | 4-8282 | 1/1992 |
| JP | 4-26432 | 1/1992 |
| JP | 4-24291 | 2/1992 |
| JP | 4-133280 | 5/1992 |
| JP | 4-69865 | 6/1992 |
| JP | 2595130 | 7/1993 |
| WO | WO 84/04834 | * 5/1983 |
| WO | WO 84/04834 | 12/1984 |

OTHER PUBLICATIONS

Hewlett Packard User's Manual, Model HP LaserJet 4L Printer, date unknown.
Research Disclosure; No. 28018; Kenneth Mason Publications Ltd. England; Aug. 1987.
Patent Abstracts of Japan, vol. 12, No. 32, JP62 183088 (Hitachi Ltd.), Nov. 8, 1987.
Patent Abstracts of Japan, vol. 15, No. 75, JP02 293991 (Seiko Epson Corp.), May 12, 1990.
Patent Abstracts of Japan, vol. 17, No. 369, JP05–054624 (Fujitsu Ltd.), May 3, 1993.

*Primary Examiner*—Kamand Cuneo
*Assistant Examiner*—Tuan Dinh
(74) *Attorney, Agent, or Firm*—Lerner, David, Littenberg, Krumholz & Mentlik, LLP (57) ABSTRACT

A game machine having a plurality of controllers has removable memory devices corresponding or e-to-one to the controllers so that it is possible to store game control processes and the like personal to individual game users and improve the freedom with which a game can be joined, played and left by each of a plurality of players.

Live unplugging of the controllers and the memory devices is provided for so that, even during a game, they can be freely plugged in and unplugged with respect to the game machine proper.

8 Claims, 9 Drawing Sheets

U.S. PATENT DOCUMENTS

| | | |
|---|---|---|
| 4,858,930 A | 8/1989 | Sato |
| 4,867,690 A | 9/1989 | Thumma |
| 4,922,420 A | 5/1990 | Nakagawa et al. |
| 4,949,298 A | 8/1990 | Nakanishi et al. |
| 4,975,805 A | 12/1990 | Schmutzler |
| 4,985,870 A | 1/1991 | Faraci |
| 5,014,982 A | 5/1991 | Okada et al. |
| 5,092,799 A | 3/1992 | Kimura |
| 5,114,157 A | 5/1992 | Kita |
| 5,192,082 A * | 3/1993 | Inoue et al. ............... 273/435 |
| 5,273,294 A | 12/1993 | Amanai |
| 5,296,692 A | 3/1994 | Shino |
| 5,323,291 A * | 6/1994 | Boyle et al. ............... 361/683 |
| 5,362,068 A | 11/1994 | Liu |
| 5,395,112 A | 3/1995 | Darling |
| 5,541,448 A | 7/1996 | Carpenter |
| 5,553,864 A * | 9/1996 | Sitrick .................... 463/31 |
| 5,599,231 A * | 2/1997 | Hibino et al. ............... 463/29 |
| 5,624,316 A * | 4/1997 | Roskowski et al. ......... 463/364 |
| 5,630,170 A * | 5/1997 | Koizumi et al. ............ 395/834 |
| 5,650,916 A | 7/1997 | Osaki et al. |
| 5,726,867 A | 3/1998 | Zarreii |
| 5,940,275 A | 8/1999 | Laity |
| 6,184,922 B1 | 2/2001 | Saito et al. |

* cited by examiner

GAME MACHINE APPARATUS

RELATED APPLICATION DATA

This application is a continuation of U.S. application Ser. No. 09/234,018 filed Jan. 19, 1999, which application is a continuation of U.S. application Ser. No. 08/450,683 filed May 25, 1995. The present and foregoing applications claim priority to Japanese application No. P06-115573 filed May 27, 1994. All of the foregoing applications are incorporated herein by reference to the extent permitted by law.

BACKGROUND OF THE INVENTION

This invention relates to a game machine apparatus and particularly to a game machine apparatus provided with a plurality of controllers having controls for operating the apparatus wherein for each controller there is provided a memory for storing a control state controlled by the respective controller.

Among conventional game machine apparatuses, those wherein a controller is mounted on a game machine proper and various games are played by operating the game machine by means of this controller are widely known.

In this kind of game machine apparatus, the game machine proper is provided with a memory device for storing game control processes and the like.

This memory device is either incorporated into the game machine proper or incorporated into a software cartridge or recording is performed on a backup card; data is suitably saved in the memory device so that after a temporary break in a game saved data on the state of the game can be read out and the game reopened.

However, in the conventional game machine apparatus described above, with respect to one game machine proper there is only one memory device provided as memory for saving game control processes and the like and it is not possible to save game control processes and the like personal to each of a plurality of game users. Also, there has been the problem that there are limits on the capacity and management of data saved.

Furthermore, in conventional game machine apparatuses, because connection terminals of the controller and the memory device for storing game control processes do not allow live unplugging (do not have electrical provision allowing peripheral devices to be disconnected while the power supply to the apparatus is on), it is necessary to turn the power supply of the game machine proper off before fitting and thereby electrically connecting the controller and the memory device to the game machine proper. It has also been necessary to turn the power supply of the game machine proper off when removing them from the game machine proper.

Because of this, there has been the problem that when a player or players join a game mid-way through a game or store their own respective data. in the memory device mid-way through a game it is necessary to turn the power supply of the game machine proper off and break off the game each time.

Accordingly, there has been a need to realize a memory device for storing game control processes and the like personal to individual game users and a controller and a memory device with which it is possible for example to join a game already in progress.

SUMMARY OF THE INVENTION

To solve the above-mentioned problems, a game machine apparatus according to this invention comprises a game machine made up of a game machine proper into which a game medium is suitably loaded and which controls the state of a game and a plurality of controllers provided with a plurality of controls for controlling the game by way of the game machine proper and memory devices provided in one-to-one correspondence with the controllers.

In a game machine apparatus according to the invention, the memory devices can store control situations of one or a plurality of players; the memory devices are removable; the memory devices are disposed on the game machine proper side or the controller side; connection terminals of the memory devices are of a type allowing live unplugging; grip portions of the controllers and memory devices fitted to the game machine proper are substantially the same shape; non-slip machining has been carried out on the grip portions; the memory devices are provided with non-volatile memory; and connection terminals of the controllers are of a type allowing live unplugging.

Having the above constitution, a game machine apparatus according to the invention has the following features:

Because a game machine apparatus according to the invention is made up of a game machine proper and a plurality of controllers provided with controls for controlling this game machine proper and it is possible for a plurality of controllers to be simultaneously connected to the game machine proper, and there are provided individual memory devices corresponding to each of a plurality of controllers, it becomes possible for a plurality of players to store data on game control processes and the like in their own individual memory devices.

Because the memory devices are removable it is possible to store and freely carry around game control processes personal to individual game users.

Because the connection terminals of the individual memory devices are of a type allowing live unplugging, the connection terminals can be plugged/unplugged freely even when power is being supplied to the game machine proper.

Because the grip portions of the memory devices and the controllers are made substantially the same shape, whether or not they are correctly fitted to the game machine proper can be judged easily by visual observation.

Because non-slip machining has been carried out on the grip portions, it is possible for unplugging/plugging of the memory devices with respect to the main body or to the controllers to be carried out simply and certainly.

Because the memory used in the memory devices is non-volatile memory, it is unnecessary for the memory devices themselves to have a power source or the like for the memory, and it is possible to make the memory devices small and simple.

Having the constitution described above, a game machine apparatus according to the invention has the following merits:

As a result of it being possible to connect a plurality of controllers to the game machine proper simultaneously and there being provided memory devices corresponding to each of a plurality of controllers, it is possible for a plurality of game users to store game data in their own individual memory devices and there is the valuable merit that it is possible to contribute to the convenience of users using the game.

As a result of the memory devices being able to store the control situations of one or a plurality of players, there is the valuable merit that it is possible to freely carry them around as backup personal to individual players.

As a result of the memory devices being removable it is possible to store and freely carry game control processes personal to game users and there is the valuable merit that it is possible to greatly improve the game use form.

As a result of the connection terminals of the memory devices being of a type allowing live unplugging, there is the valuable merit that unplugging/plugging of the connection terminals when power is being supplied to the game machine proper does not affect other game users using the game.

As a result of the grip portions of the memory devices and the controllers being substantially the same shape, there is the valuable merit that judgment of whether or not they are correctly fitted to the game machine proper is extremely easy.

As a result of non-slip machining having been carried out on the grip portions, it is possible for unplugging/plugging into the game machine proper to be carried out simply and certainly, and there is the valuable merit that electrical connection effected by unplugging/plugging can be carried out correctly.

As a result of the connection terminals connecting the controllers to the game machine proper being of a type allowing live unplugging, there is the valuable merit that even during control with other controllers unplugging/plugging of a controller does not affect other players in mid-game.

DETAILED DESCRIPTION OF THE PREFERRED EMBODIMENTS

A preferred embodiment of a game machine apparatus according to the invention will now be described in detail with reference to the accompanying drawings.

Figure 1:
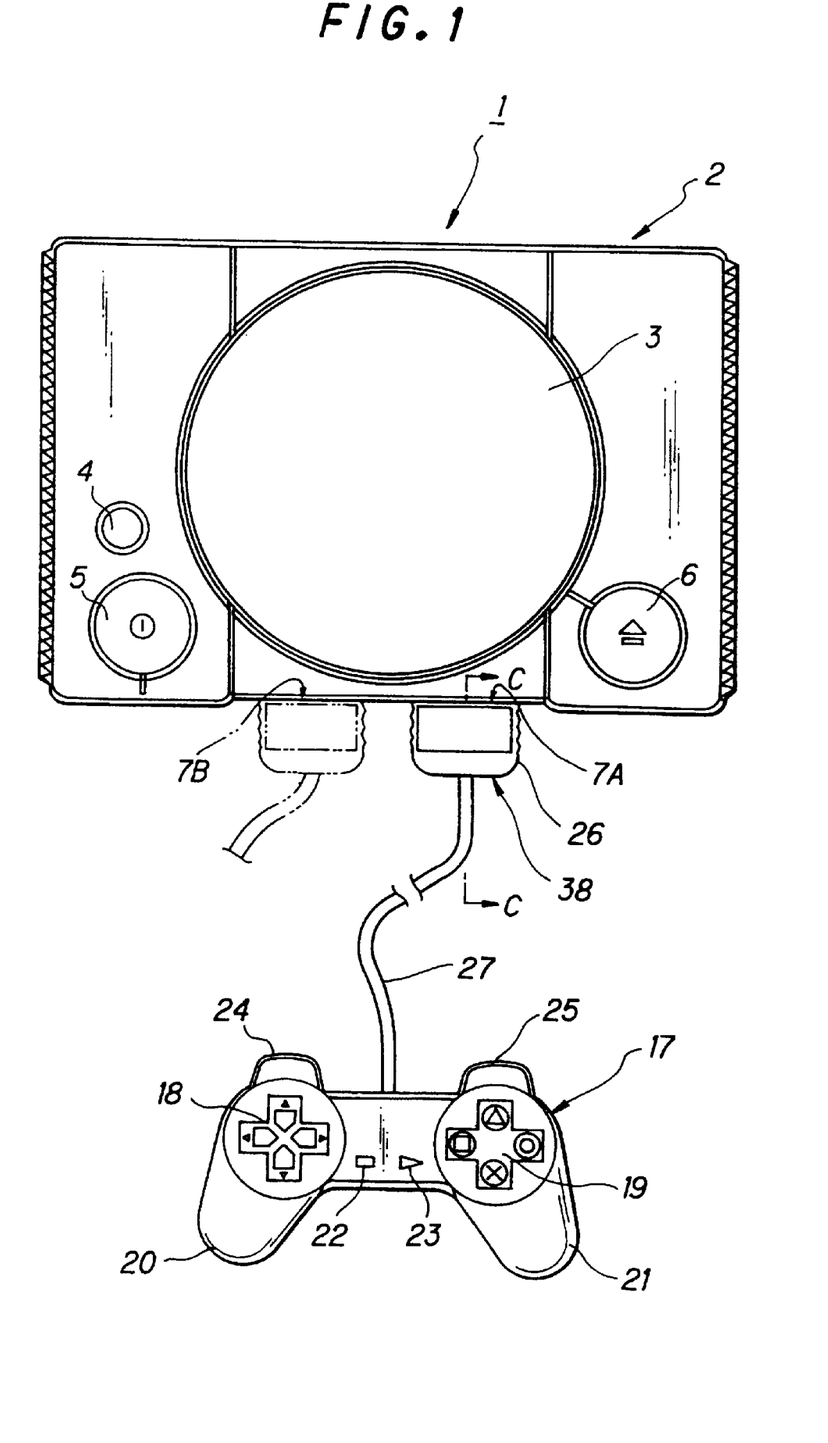
FIG. 1 is a simplified view showing the overall constitution of a game machine apparatus according to the invention.

As shown in FIG. 1, a game machine apparatus 1 according to this preferred embodiment is made up of a game machine proper 2, a controller 17 having a substantially rectangular connection terminal part 26 for connecting to this game machine proper 2, and a memory device 38 of the same shape as the connection terminal part 26. These will be described in the following order:

[1] game machine proper.
[2] controller
[3] memory device
[4] connection arrangement

[1] Game Machine Proper

Figure 2:
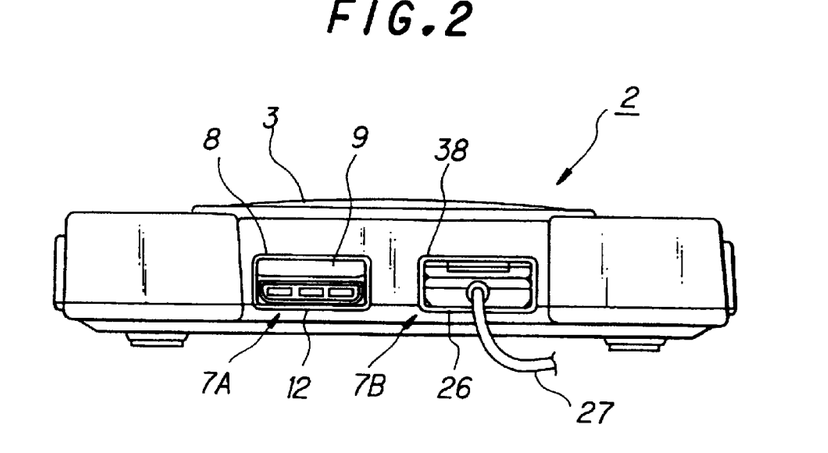
FIG. 2 is a front view of the apparatus.
Figure 3:
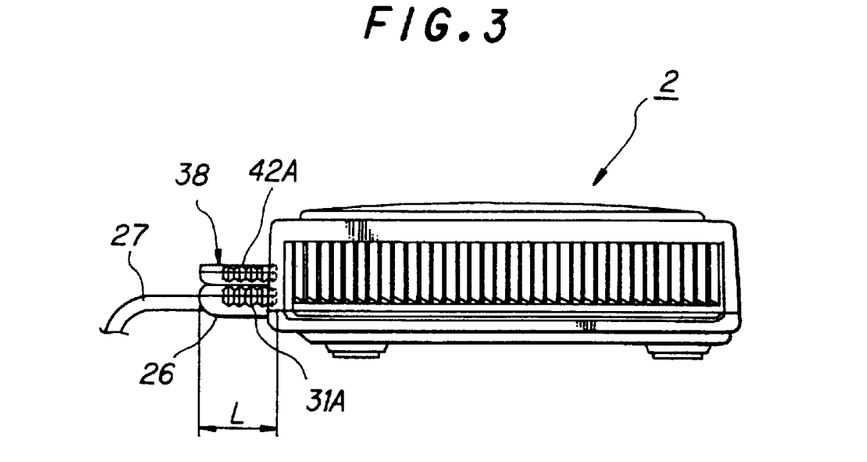
FIG. 3 is a side view of the apparatus.

As shown in FIG. 1 through FIG. 3, the game machine proper 2 is substantially rectangular and is made up of a disc loading part 3 in a central position thereof into which is loaded a disc constituting a game medium and in other suitable positions on the game machine proper a reset switch 4 for freely resetting a game, a power switch 5 for switching a power supply ON and OFF, a disc control switch 6 for controlling loading of the disc, and connecting parts 7A, 7B . . . to which a plurality of controllers 17 and memory devices 38 are connected. The game medium is not limited to a disc.

Figure 14:
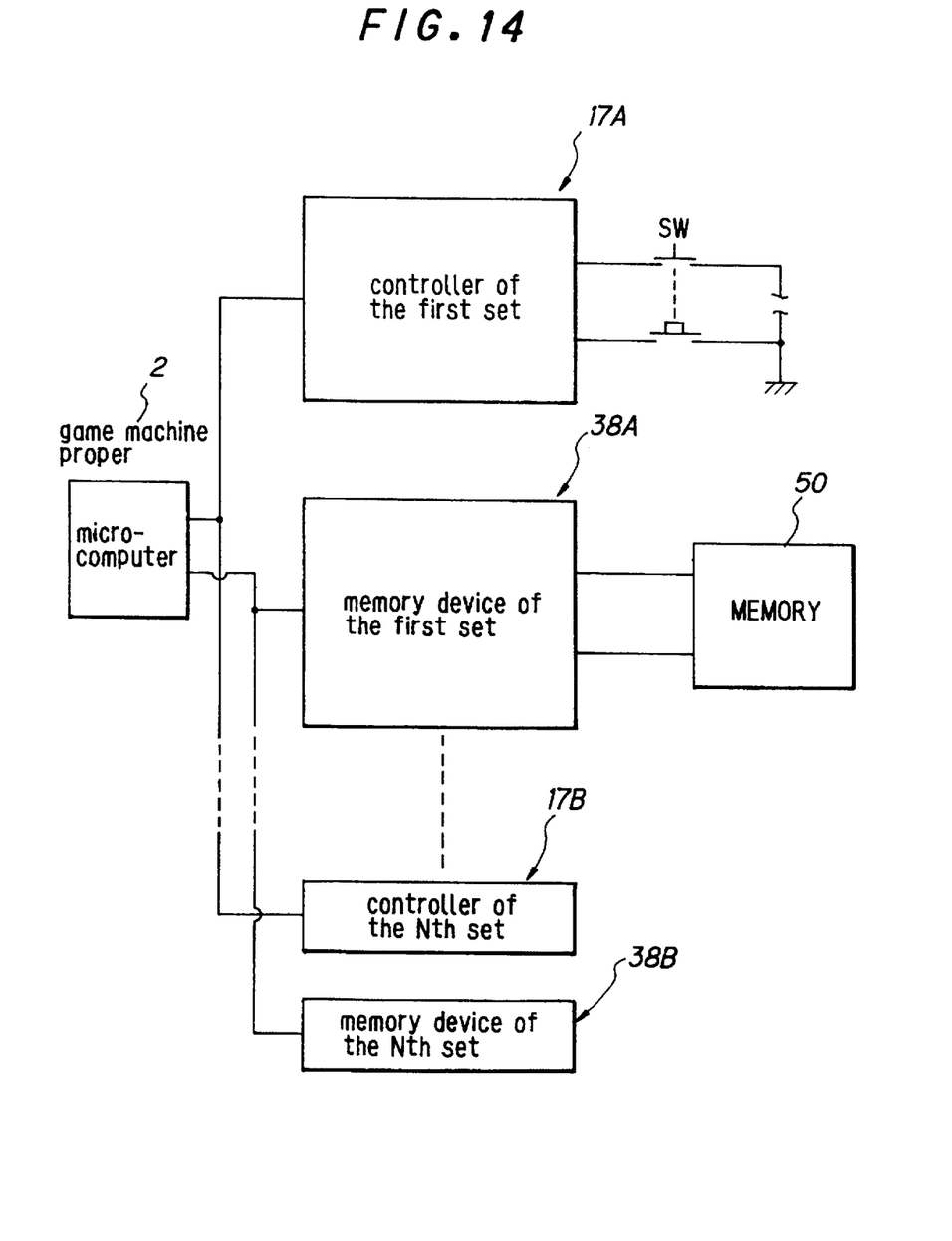
FIG. 14 is a simplified view showing the connection state of a game machine apparatus according to the invention.

As shown in FIG. 14, a plurality of controllers 17A and 17B and memory devices 38A and 38B can be connected to this game machine proper 2. In the preferred embodiment shown in FIG. 1, connecting parts 7A and 7B to which two sets of a controller 17 and a memory device 38 can be connected are provided, but of course the invention is not limited to two sets.

As shown in FIG. 2 and FIG. 3, each of the connecting parts 7A and 7B is formed with two levels; a memory insertion part 8 to which a memory device 38 is connected is disposed in the upper level and a connection terminal insertion part 12 to which a connection terminal part 26 of a controller 17 is connected is disposed in the lower level.

The insertion opening in the memory device insertion part 8 is rectangular and long in the horizontal direction, and the corners at the ends of the lower side thereof are more rounded than the corners at the ends of the upper side so that a memory device 38 cannot be inserted upside-down.

Figure 8:
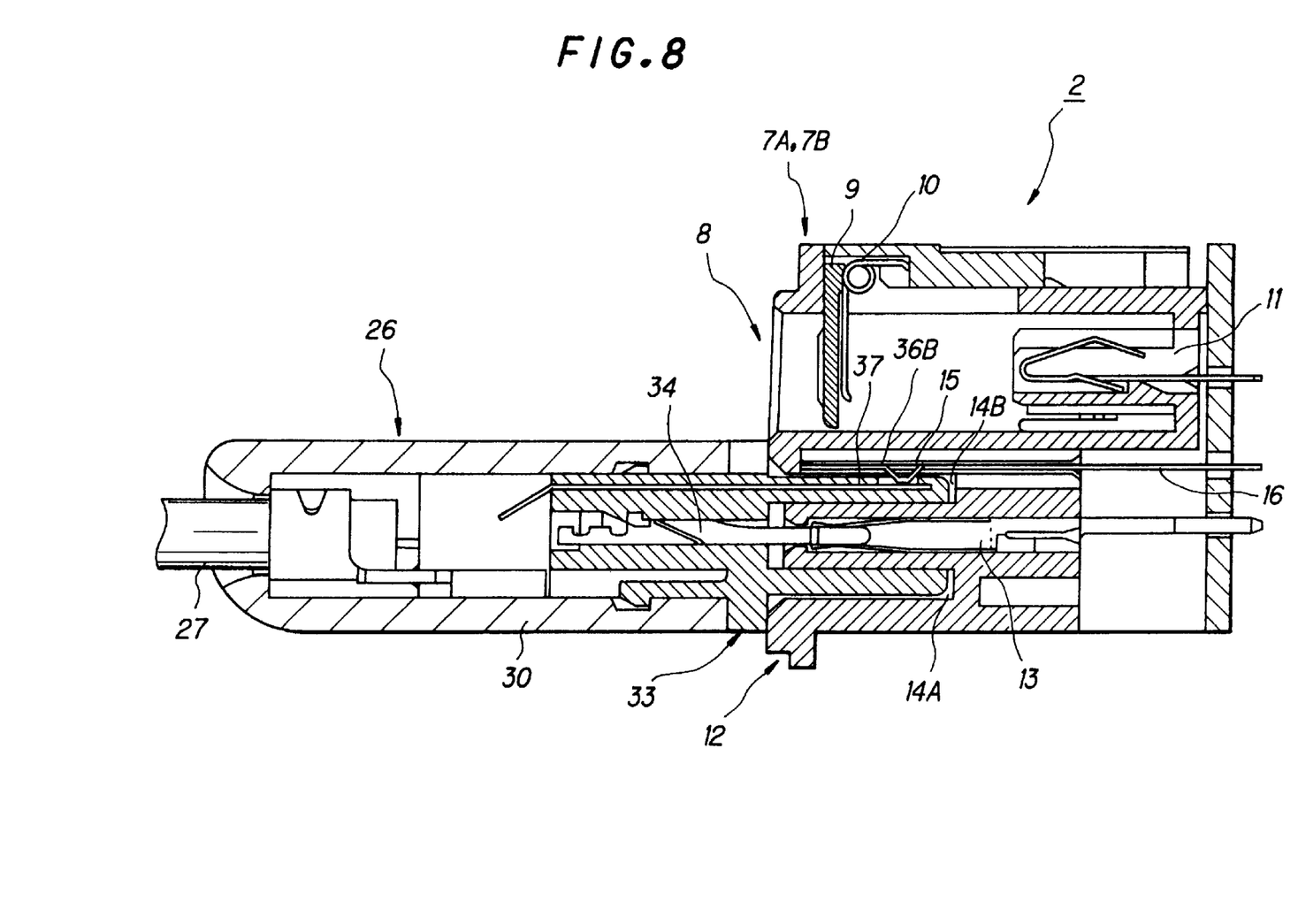
FIG. 8 is a sectional view on the line C—C as of when a connection terminal part is connected to a game machine proper shown in FIG. 1.
Figure 9:
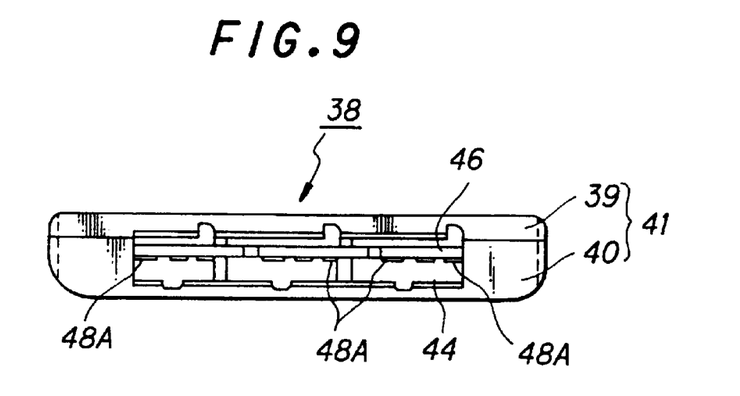
FIG. 9 is a simplified front view of a memory device according to the invention.
Figure 10:
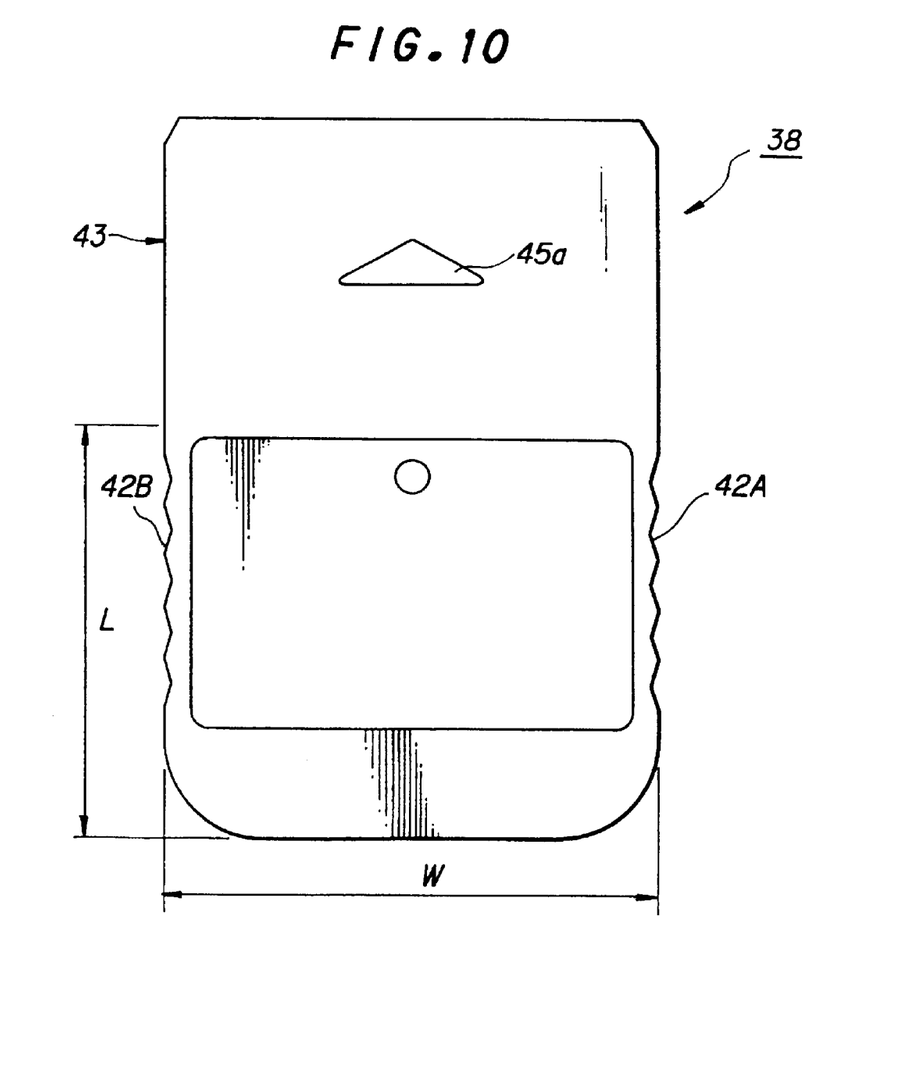
FIG. 10 is a plan view of the memory device.
Figure 11:
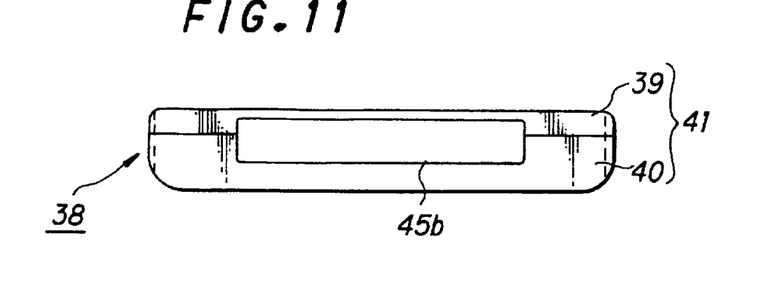
FIG. 11 is a rear view of the memory device.
Figure 12:
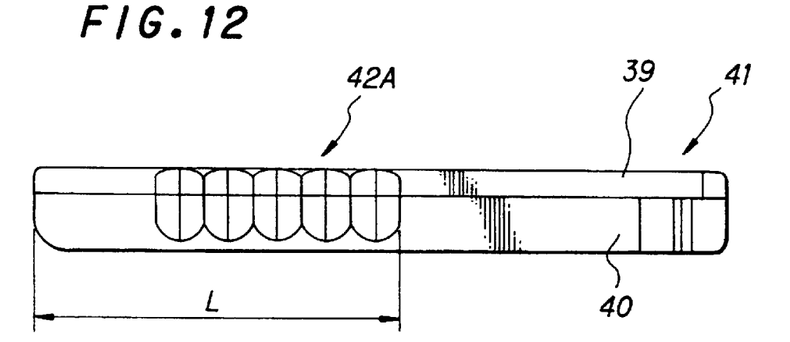
FIG. 12 is a side view of the memory device.

As shown in FIG. 2 and FIG. 8, the memory device insertion part 8 is provided with a shutter 9 which protects terminals inside effecting electrical connection, and a memory connection terminal part 11 to which a memory device 38 is connected is disposed inside the memory device insertion part 8.

As shown in FIG. 8, the shutter 9 is so mounted that it is at all times urged outward by a coil twist spring 10. As a result, when a memory device 38 is plugged in, the shutter 9 is opened inwardly by the front end of the memory device 38 as it enters, and when the memory device 38 is unplugged the shutter 9 is returned by the urging force of the spring 10 and automatically closes, fulfilling a role of keeping dust out of the memory connection terminal 11 and a role of protecting it from shock from outside.

The memory connection terminal part 11 is made up of terminals not shown in the drawings for suitably writing data controlled in a game into a non-volatile memory such as a flash memory, and comprises power supply terminals and signal terminals.

As shown in FIG. 2 and FIG. 3, the connection terminal insertion part 12 has an insertion opening which is rectangular and long in the horizontal direction and of which the corners at the ends of the lower side are more rounded than the corners at the ends of the upper side so that the connection terminal part 26 of a controller 17 cannot be inserted upside-down. Also, the shape of the insertion opening of the connection terminal insertion part 12 is different from the shape of the insertion opening of the memory device insertion part 8 so that a memory device 38 cannot be inserted therein. Thus the sizes and shapes of the insertion openings for the memory device 38 and the connection terminal part 26 of the controller 17 are made different so that they will not be mistakenly inserted in the wrong insertion part.

As shown in FIG. 8, the internal structure of the connection terminal insertion part 12 is made up of necked-bottle shaped cylindrical power supply and signal connection parts 13 in a substantially central position which connect with power supply and signal contact pins 34 of a connection terminal part 26 of a controller 17, guide grooves 14A and 14B in positions above and below these power supply and signal connection parts 13 which guide the connection terminal part 26 of the controller 17 when it is positioned and inserted, and a shield connector part 16 having a shield contact 15 above the guide groove 14B for shielding to block radiation from the game machine proper 2.

When the connection terminal part 26 of a controller 17 is fitted into the game machine proper 2 thus constructed, it is guided by the guide grooves 14A and 14B and becomes connected to the shield contact 15. As will be further discussed later, the power supply and signal connection parts 13 and the cylindrical contact pins are connected. At this time, because the contact pins on the controller 17 side are in a positional relationship such that the power supply contact pins project further than the signal contact pins, the power supply is supplied first and the signal contact pins are connected thereafter.

When a memory device 38 is fitted, it opens the shutter 9 by pushing it inward with its front end and becomes connected with the memory connection terminal part 11. At this time, because like the controller 17 described above there is the positional relationship that the power supply terminals project further than the signal terminals, the power supply terminals are connected and power is supplied and then the signal terminals are connected thereafter.

In this way, the game machine proper 2 can control the so-called state of the game. Here, control of the state of the game is mainly control of the progress, display, and sound of the game.

[2] Controller

As shown in FIG. 1, the controller 17 is of a structure such that it can be held in the palms of both hands and five fingers of each hand can move freely to operate the controls, and is made up of left-right symmetrically disposed round first and second controls 18 and 19, first and second support parts 20 and 21 projecting angularly from the first and second controls 18 and 19, a select switch 22 and a start switch 23 disposed on a waisted part between these first and second support parts 20 and 21, third and fourth controls 24 and 25 projecting from the front surfaces of the first and second controls 18 and 19, and the connection terminal part 26 which electrically connects the controller 17 to the game machine proper 2 by way of a cable 27. A construction dispensing with the cable 27 may alternatively be adopted.

As shown in FIG. 14, controller 17 interconnects the game machine proper and respective switches SW of the first and second controls 18 and 19, the select switch 22, the start switch 23 and the third and fourth controls 24 and 25.

As shown in FIG. 1 and FIG. 4 through FIG. 8, the connection terminal part 26 is attached to the end of the cable 27 for electrically connecting to the game machine proper and is made up of a substantially rectangular housing 30 which can be split into an upper shell 28 and a lower shell 29 and an engaging part 33 at the front end of this housing 30 which engages with and restrains the power supply and signal contact pins.

Grip portions 31A and 31B non-slip machined (for example knurled) in a corrugated, notched pattern are provided on both side surfaces of the exterior of the housing 30, and a cable engaging portion 32 for gripping the cable 27 is provided at the rear end of the housing 30.

The grip portions 31A and 31B constitute a so-called unplugging/plugging portion, and the size thereof, i.e. the width W and length L thereof, is the same as that of a grip portion of the memory device 38 which will be further discussed later.

Figure 6:
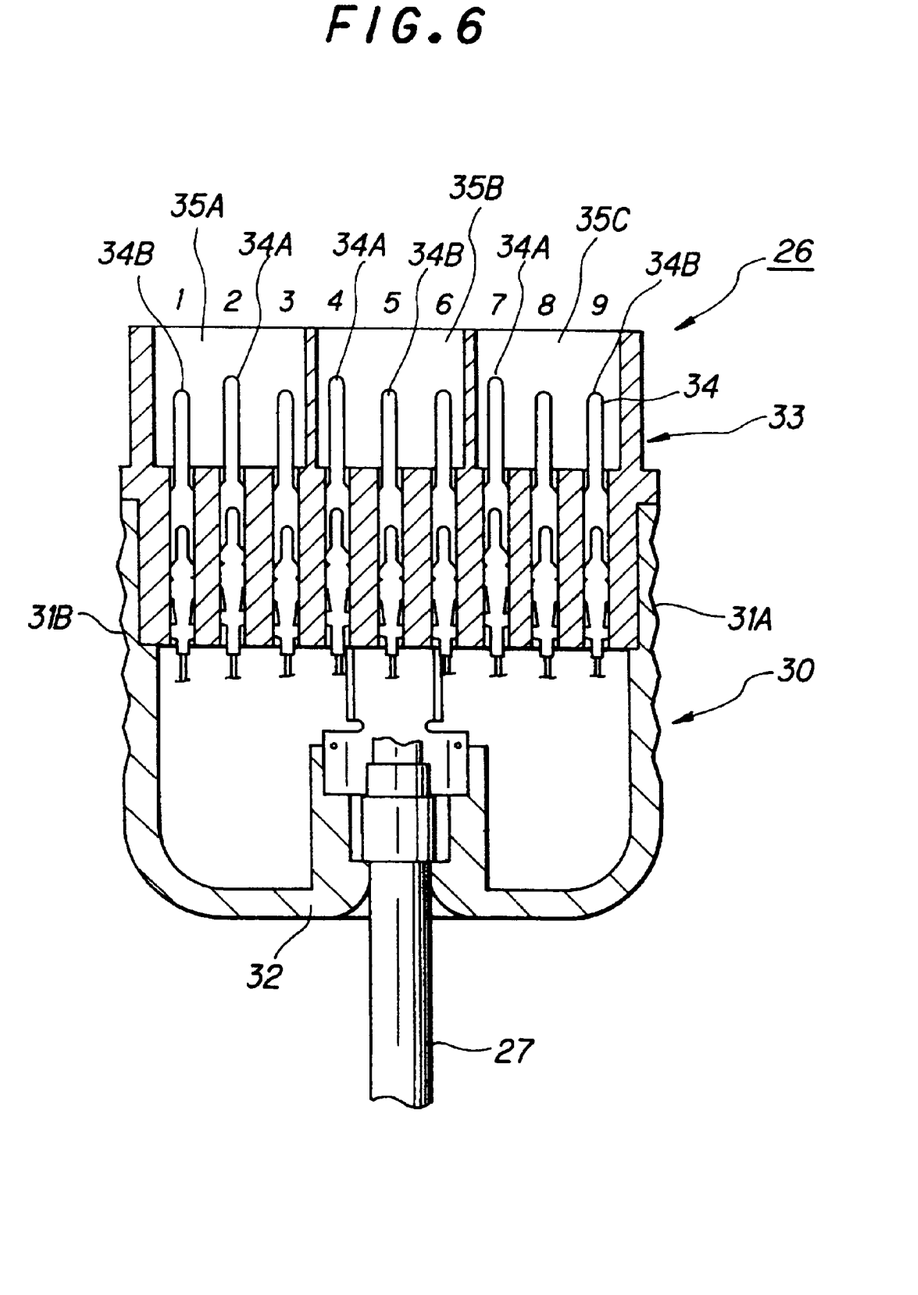
FIG. 6 is a sectional view on the line A—A of the connection terminal part shown in FIG. 5.
Figure 7:
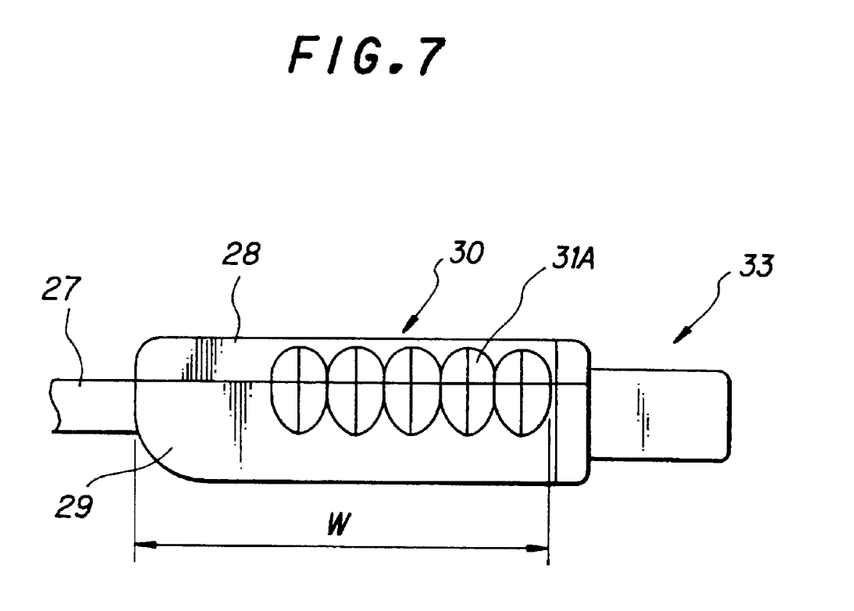
FIG. 7 is a side view of a connection terminal part of a controller according to the invention.

As shown in FIG. 6, the engaging part 33 has a plurality of contact pins 34 disposed in a line in an interior molded into a substantially rectangular shape and effects electrical connection to the game machine proper 2; its base end engages with and is restrained by the housing 30, and its front end is divided into three compartments 35A, 35B and 35c each grouping three contact pins 34. In this way, the contact pins 34 are covered so that the ends of the projecting contact pins 34 are protected from shocks and the like from outside.

The contact pins 34 consist of three contact pins 34 in each of the three compartments 35A, 35B and 35c, in a positional relationship such that one of them is longer than the other two.

In this preferred embodiment, pins nos. 2, 4 and 7 are power supply contact pins 34A and project further than the signal contact pins 34B. This constitution wherein the ends of the pins project like this allows so-called live unplugging.

That is, if the power supply contact pins 34A are made the long pins (pins nos. 2, 4 and 7), when the connection terminal part 26 of a controller 17 is plugged into the game machine proper 2 while it is operating, first power is supplied and a stable operating state is established before the signal contact pins 34B are connected, and malfunctioning such as runaway can be prevented. Reversely, during unplugging the power supply contact pins 34A are unplugged after the signal contact pins 34B have all been unplugged.

As a result, even during a game for which a plurality of controllers 17 are being used, the connection terminal part 26 of a controller 17 can be freely unplugged/plugged into the game machine proper 2 without affecting other controllers 17 in mid-game and participation in and withdrawal from the game can be carried out freely.

Figure 4:
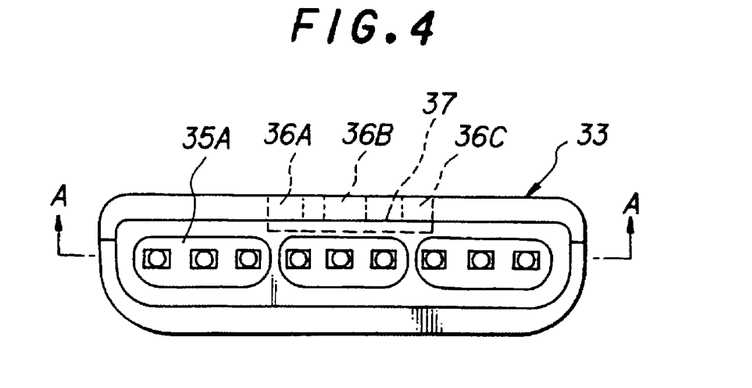
FIG. 4 is a front view of a connection terminal part of the apparatus.
Figure 5:
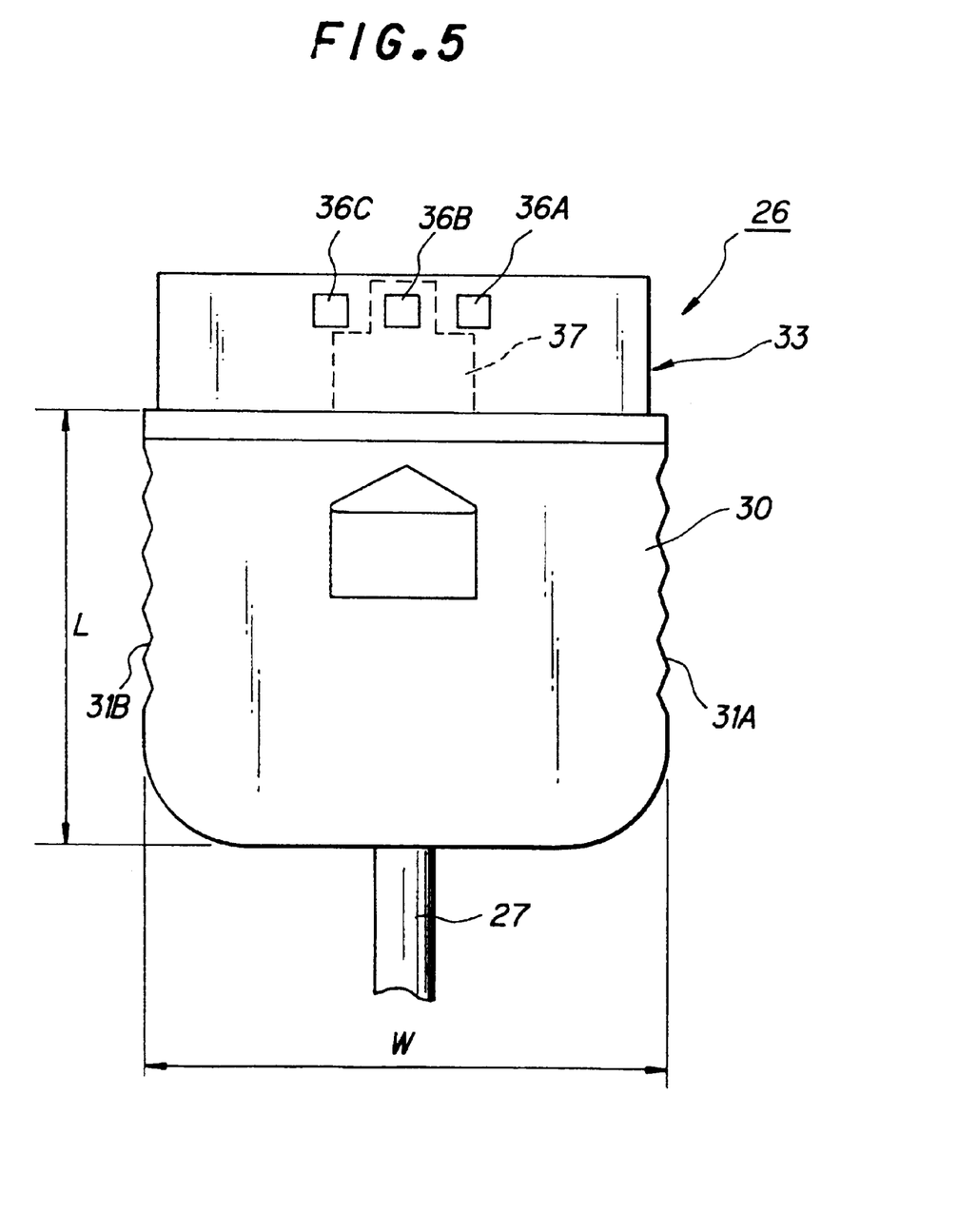
FIG. 5 is a plan view of the same connection terminal part.

As shown in FIG. 4, FIG. 5 and FIG. 8, three suitably spaced apertures 36A, 36B and 36C are provided in the vicinity of the center of the front end of the engaging part 33, and a shield member 37 for blocking radiation from the game machine proper 2 is inserted on the inner side thereof.

Of the three apertures 36A, 36B and 36C, the two apertures 36A and 36C at the sides restrain the game machine proper 2 in a half-lock state when they engage therewith, and the middle aperture 36B is connected to the shield contact 15 of the game machine proper 2.

That is, as shown in FIG. 8, when the connection terminal part 26 of a controller 17 is fitted into the game machine proper 2, first it is inserted guided by the guide grooves 14A and 14B from the front end of the engaging part 33. Then first the shield member 37 facing out of the aperture 36B is connected to the shield contact 15, substantially simultaneously with this the power supply contact pins 34A are connected and power is supplied, and the signal contact pins 34B are connected thereafter. Although not shown in the drawings, the surrounding of the contact pins 34 is also shielded with a shield member.

[3] Memory Device

As shown in FIG. 2 and FIG. 3 and especially FIG. 9 through FIG. 12, the memory device 38 is made up of a housing 41 consisting of a substantially flat rectangular upper shell 39 and lower shell 40 and a circuit board 46 inside this housing 41 on which is mounted a memory.

The housing 41 is made up of non-slip machined (for example knurled) grip portions 42A and 42B on both side surfaces of its rear portion and a fitting portion 43 which is fitted into the game machine proper 2; the front end surface of this fitting portion 43 is provided with a rectangular window portion 44.

The grip portions 42A and 42B constitute a so-called unplugging/plugging portion which is plugged into the game machine proper 2, and their size, i.e. their width W and length L, is the same as the size of the grip portions 31A and 31B of the connection terminal part 26 of the controller 17 described above.

That is, as shown in FIG. 1, FIG. 2 and FIG. 3, the controller 17 and the memory device 38 can be fitted into the game machine proper 2 so that viewed from above, viewed from below or viewed from either side they overlap in the same shape. As a result, it is possible to easily discern visually whether or not they are correctly fitted.

The surface of the fitting portion 43 is provided with a direction indicating mark 45a showing the direction for fitting into the game machine proper 2. By means of this mark 45a, users using the game can easily distinguish the direction and the front and back of the memory device 38 when fitting it into the game machine proper 2.

A label affixing portion 45b is provided on the end surface of the end opposite the window portion 44 so that the memory device 38 can easily be identified.

Inside the memory device 38, a memory terminal part 47 of the circuit board 46 comprising power supply and signal terminals faces outward through the window portion 44.

Figure 13:
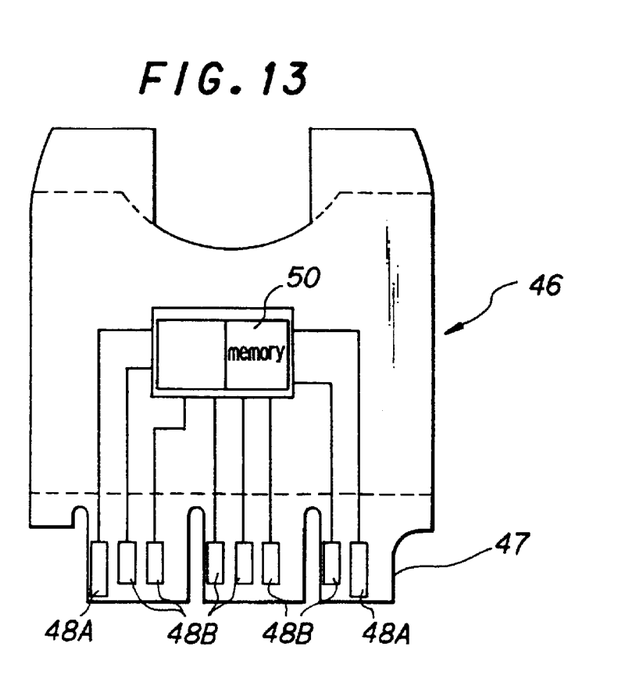
FIG. 13 is a simplified plan view of a circuit board inside the memory device.

A shown particularly in FIG. 13, the circuit board 46 has mounted thereon in a predetermined position a substantially flat, rectangular memory 50 and comprises the memory terminal part 47 connected to this memory.

The memory terminal part 47 is made up of power supply terminals 48A and signal terminals 48B, and the power supply terminals 48A project further than the signal terminals 48B and are disposed in an aligned state.

That is, when the memory device 38 is electrically connected to the game machine proper 2, first the power supply terminals 48A, 48A become connected and power is supplied to the memory so the memory can operate fully and then after that the signal terminals 48B are connected and connection of the memory 50 mounted in the memory device 38 and the game machine proper 2 is completed.

By adopting this type of structure allowing so-called live unplugging wherein power s first supplied to the power supply terminals 48A before the signal terminals 48B are connected, when the memory device 38 is fitted to the game machine proper 2, even if the game machine proper 2 is operating, that is, even during a game, it is possible to unplug/plug the memory device 38 freely. As described above, this structure allowing live unplugging is also applied to the connection terminal part 26 of the controller 17 described above.

As shown in FIG. 13 and FIG. 14, the memory device 38 connects the memory 50 mounted on the circuit board 46 to the game machine proper 2

The memory 50 used here is a non-volatile memory, for example flash EEPROM, NAND EEPROM, UV/EPROM or the like typified by EEPROM, and consists of semiconductor memory in which stored information is retained after the power supply is cut off.

As a result, a battery of a power source or the like and circuit thereof for holding the information can be dispensed with, and the structure can be made small and simple. In this preferred embodiment the memory device 38 is fitted to the game machine proper 2 side, but it may alternatively be made removably connectable to the controller 17 side.

[4] Connection Arrangement

As described above, in a constitution wherein controllers 17 and memory devices 38 can be connected to the game machine proper 2, as shown in FIG. 14, a plurality of controllers 17 can be connected and respective memory devices 38 corresponding to respective ones of the connected controllers 17 can be fitted.

That is, if the constitution is such that a controller 17A and a memory device 38A of a first set to a controller 17B and a memory device 38B of an Nth set can be connected to the game machine proper 2, when the controller 17A of the first set is fitted, a memory device 38A of the first set corresponding thereto personal to a user controlling the game can be fitted and the game content controlled by the controller 17A of the first set can be suitably recorded in the memory device 38A of the first set.

In the above preferred embodiment the description was of a game apparatus, but the invention is of course not limited to a game apparatus and can be used for a form of business dealing, for example securities trading or information reference, for instance for access to a certain database or the like. In this case, connections with devices required for the loading of the medium replacing the game medium and communication in both directions and the like are necessary.

Related applications include Japanese Patent Application Nos.

05-190763 (File Date: 1993. 06. 03),
05-190764 (File Date: 1993. 07. 02),
05-258625 (File Date: 1993. 10. 15),
06-027405 (File Date: 1994. 01. 31),
06-094988 (File Date: 1994. 05. 09),
06-238898 (File Date: 1994. 10. 03) and
06-142454 (File Date: 1994. 06. 01), submitted by the present applicant. Each of the above applications is owned by the assignee of the present invention and is hereby incorporated by way of reference. (U.S. Patents corresponding to these seven Japanese applications are currently being applied for.)

What is claimed is:

1. A game apparatus, comprising:
   a game machine operable to process data for playing a game, said game machine having first and second controller ports dedicated to receive connection terminals of first and second controllers for operating said game, and first and second memory device ports dedicated to receive first and second memory devices, said first memory device for storing data representing a state of said game achieved by said first controller, and said second memory device for storing data representing a state of said game achieved by said second controller, each of said first and second controller ports being shaped to receive said connection terminal of one of said controllers in only a single orientation, and each of said first and second memory device ports being shaped to receive one of said first and second memory devices in only a single orientation.

2. The game apparatus according to claim 1, wherein each of said first and second memory device ports includes a shutter adapted to be opened on inserting the memory device into said memory device port and adapted to be automatically closed on removing the memory device from said memory device port.

3. The game apparatus according to claim 1, wherein each of said first and second controller ports is partially shielded by a shielding component for preventing said game machine from being exposed to radiation.

4. The game apparatus according to claim 1, wherein said game machine has a first connecting part including said first controller port and said first memory device port as a first pair, and a second connecting part including said second controller port and said second memory device port as a second pair.

5. The game apparatus according to claim 4, wherein said controller port is vertically aligned with said memory device port in said first and second connecting parts.

6. The game apparatus according to claim 4, wherein said controller port and said memory device port in said first and second connecting parts include an upper portion and a lower portion, said upper portion having a different shape than said lower portion.

7. The game apparatus according to claim 6, wherein said lower portion has corners that are more rounded than corners of said upper portion.

8. The game apparatus according to claim 4, wherein, in each of said first and second connecting parts, said controller port has a predetermined shape, and said memory device port has a shape different from said predetermined shape.

* * * * *

UNITED STATES PATENT AND TRADEMARK OFFICE
CERTIFICATE OF CORRECTION

PATENT NO. : 6,466,450 B1  Page 1 of 1
DATED : October 15, 2002
INVENTOR(S) : Ogata It is certified that error appears in the above-identified patent and that said Letters Patent is hereby corrected as shown below:

<u>Title page,</u>
Item [57], ABSTRACT,
Line 2, "or e-to-one" should read -- one-to-one --.
Line 9, "during a game" should read -- as a game is being played --.
Line 10, "in" should read -- into --.
Line 10, "with respect to" should read -- from --.
Line 11, "proper" should be deleted.

<u>Column 7,</u>
Line 49, "s" should read -- is --.
Line 60, "2" should read -- 2. --.

<u>Column 8,</u>
Line 52, "for storing" should read -- operable to store --.
Line 54, "for storing" should read -- operable to store --.

Signed and Sealed this

Twentieth Day of May, 2003

JAMES E. ROGAN
*Director of the United States Patent and Trademark Office*